Sept. 22, 1964  R. H. SHOQUIST  3,149,705
FRICTION COUPLING
Filed Aug. 21, 1961  2 Sheets-Sheet 1
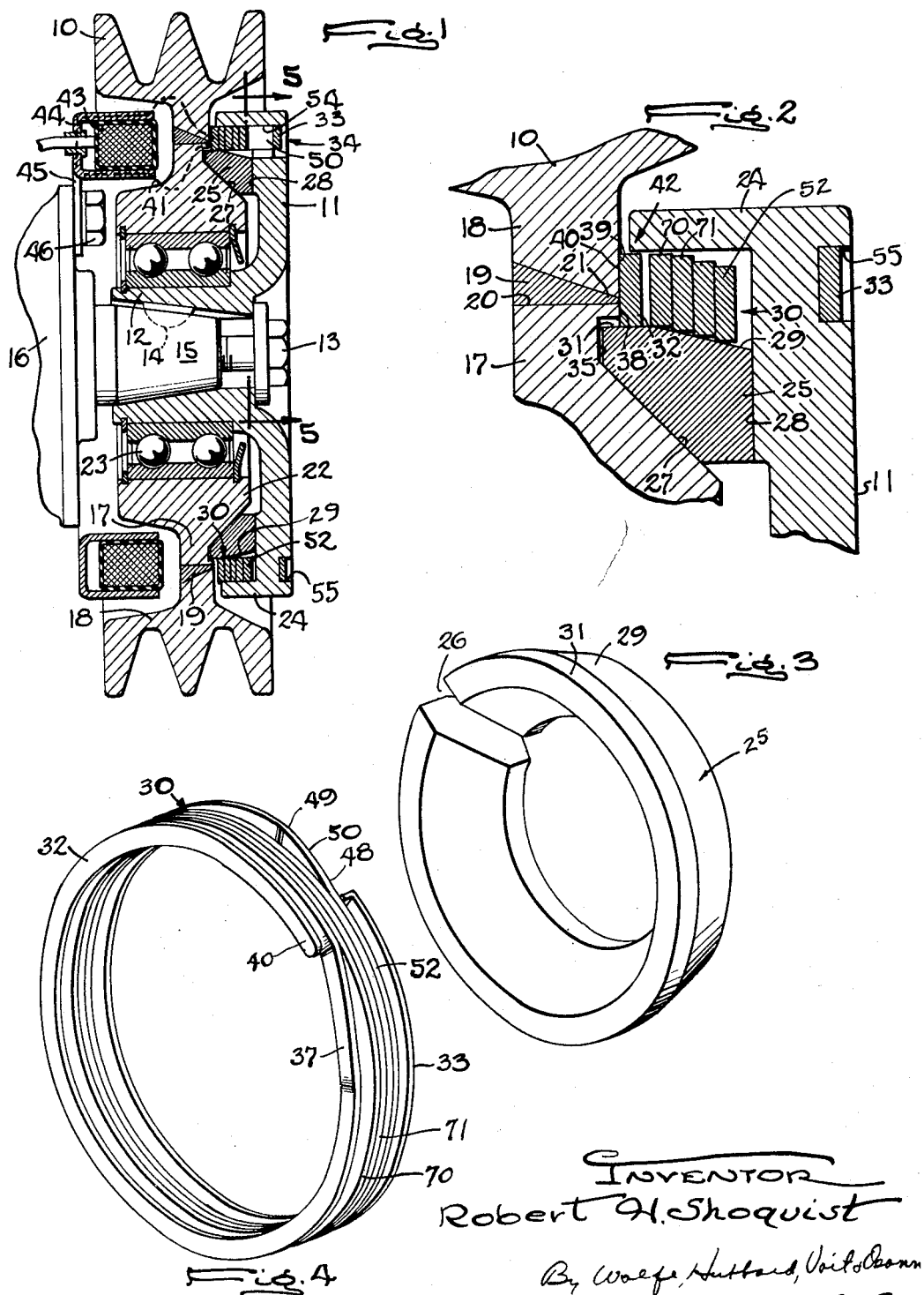
INVENTOR
Robert H. Shoquist
By Wolfe, Hubbard, Voit & Osann
ATTORNEYS Sept. 22, 1964   R. H. SHOQUIST   3,149,705
FRICTION COUPLING
Filed Aug. 21, 1961   2 Sheets-Sheet 2
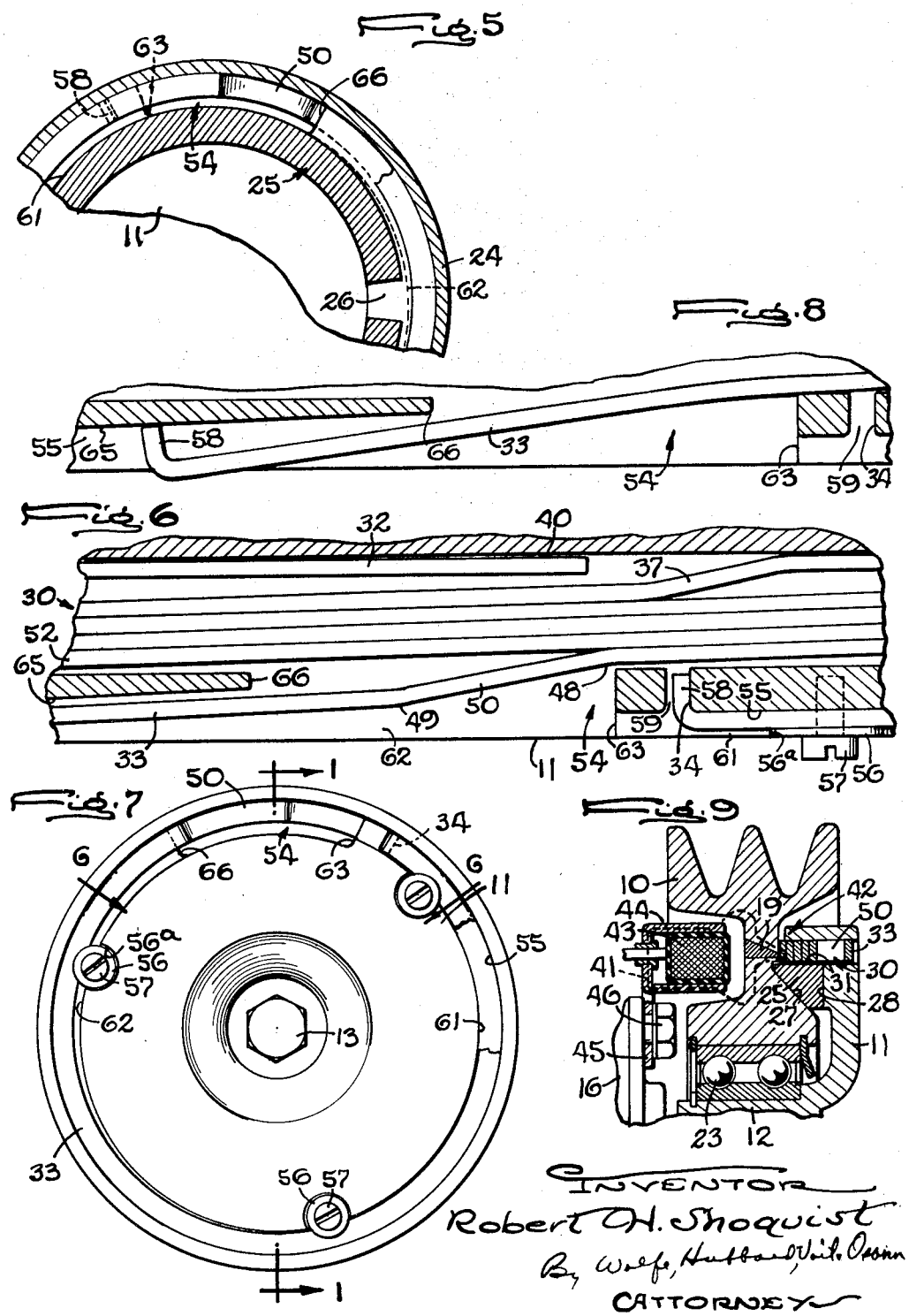

United States Patent Office 3,149,705
Patented Sept. 22, 1964

3,149,705
FRICTION COUPLING
Robert H. Shoquist, Roscoe, Ill., assignor to Warner
Electric Brake & Clutch Company, Beloit, Ill., a corporation of Delaware
Filed Aug. 21, 1961, Ser. No. 132,613
11 Claims. (Cl. 192—35)

This invention relates to friction clutches and brakes of the so-called coil type in which a free floating annular band or shoe is pressed radially into gripping engagement with relatively rotatable friction surfaces by a helical coil of resilient wire telescoped with the band and wound and unwound under the control of a friction pilot clutch which is preferably controlled magnetically.

The primary object is to provide a coupling of the above character by which the pilot torque may be amplified in a substantially greater ratio than has been possible heretofore.

Another object is to utilize the band itself and the turns of the actuator coil as an auxiliary friction clutch for deriving from the relatively rotating parts an additional torque which supplements the pilot torque in changing the diameter of the coil to actuate the band.

A more detailed object is to derive the supplemental pilot torque by angular movement of the band induced by a difference in the pressures between the band and the friction surfaces to be coupled thereby.

The invention resides in the novel shaping and positioning of the driving and driven surfaces of the main clutch to achieve optimum amplification of the pilot torque.

A further object is to anchor one end of the actuator coil in a novel manner to one of the relatively rotatable elements so as to avoid objectionable bending and stressing of the coil wire beyond the band.

Other objects and advantages of the invention will become apparent from the following detailed description taken in connection with the accompanying drawings, in which—

FIGURE 1 is a fragmentary diametrical section of the improved friction coupling and its mounting, the section being taken along the line 1—1 of FIG. 7.

FIG. 2 is a similar but somewhat enlarged view showing the parts in a different position, the section being the same as that at the bottom of FIG. 1.

FIG. 3 is a perspective view of the friction band or shoe.

FIG. 4 is a perspective view of the coil for actuating the band.

FIG. 5 is a fragmentary section taken along the line 5—5 of FIG. 1.

FIG. 6 is a section taken along the line 6—6 of FIG. 7.

FIG. 7 is an end view looking from the right in FIG. 1.

FIG. 8 is a fragmentary view similar to FIG. 6 showing the actuator coil and its support in the course of assembly.

FIG. 9 is a sectional view similar to FIG. 1 showing a modified form of the invention.

In the drawings, a clutch of the contracting band type is shown for purposes of illustration arranged to transmit rotary power from a V-belt pulley 10 of a driving member or disk to a driven member or disk 11 whose hub 12 is fixed, as by a clamping screw 13 and a key 14 onto a shaft 15 projecting from a stationary support 16.

Herein, the driving disk is divided into inner and outer parts 17 and 18 magnetically separated by a ring 19 of nonmagnetic metal such as copper filling a groove 20 and brazed to the walls thereof which converge axially toward each other to an apex 21. The latter is of narrow radial width and faces toward the driven disk 11 of the clutch. The hub 22 of the driving disk is pressed onto the outer race ring of an anti-friction thrust bearing 23. The inner race ring of the latter is pressed onto the hub 12 of the disk 11. The latter may be composed of nonmagnetic metal or plastic material and carries at its outer edge a right angular flange 24 turned inwardly toward the driving disk and loosely surrounding the parts of the clutch and its actuator.

Frictional coupling of the driving and driven disks is effected by a ring-like friction band or arcuate shoe 25 divided by one or more gaps 26 (FIG. 3) so as to be expansible and contractible radially into and out of gripping engagement with surfaces 27 and 28 formed on the driving and driven disks. The band may be composed of metal but in this instance is any well-known brake lining material such, for example, as compositions known as 610–147 sold by American Brake Block Company and Amco 3271–SW sold by H. K. Porter Company.

The cross-sectional shape of the band conforms to the contour of the driving and driven surfaces 27 and 28 which converge inwardly so as to provide a non-locking wedging action for increasing the gripping force when the band is pressed inwardly and thus contracted to engage the clutch. Such contraction is effected in the contracting type of clutch shown by winding up a coil 30 of tempered spring wire wrapped helically around the outer surface 29, 31 of the band in a direction to contract when the end turn 32, which is left free, is turned in the direction of rotation of the driving disk 17, 18, the other end turn 33 of the coil being anchored at 34 on the driven disk 11 in this instance. While the wire of the coil may be formed of any desired cross-section, it is preferably rectangular with the longer dimension disposed normal to the coil axis. The coil comprises six turns in the present instance.

In the relaxed condition, the coil telescopes loosely with the band surface 31 as shown in FIG. 1 and the adjacent surface 29 one end of which terminates at the wall 28 on the driven disk 11. To prevent engagement of the actuator coil with the end of the band surface 31, the latter is extended beyond the inner face of the driving disk into a counter-sunk recess 35 in the latter disk. The outside diameter of the band is such that with the band seated in the groove formed by the driving and driven surfaces 27 and 28 and the actuator coil 30 relaxed, the apex 21 of the nonmagnetic filling 19 will be disposed about midway between the inner and outer edges of the coil turn 32 and opposite edge portions of this turn will be disposed opposite the coplanar faces 38 and 39 on the inner side of the magnetic driving ring 10. By forming a lateral bend 37 (FIGS. 4 and 6) in the wire at the junction of the first and second turns of the coil, the entire length of the first turn is disposed in an axial plane and thus parallels surfaces 38 and 39 on the driving disk from which the turn is separated by a narrow gap 40 when the coil is relaxed (FIG. 1).

With the end turn 32 thus disposed, it is adapted for use as an armature of a magnetic pilot clutch 42 which utilizes the relative turning of the driving and driven disks to derive a friction torque for winding up the actuator coil 30 and engaging the main clutch. Herein, the pilot clutch is of the stationary field type having a multiple turn winding 43 secured in a channel-shaped core 44 which is secured through a tab 45 and a screw 46 to the end of the support 16. The core 44 is concentric with the clutch axis and telescopes loosely into a groove defined by end portions of the pulley 10 and the hub 22 which form outer and inner pole pieces terminating in the surfaces 38 and 39 which constitute the inner and outer poles of the magnet. Thus, as shown in dotted outline in FIG. 1, the stationary and rotating parts of the magnet core coact with the magnet to define a flux path 41 of torodial shape enclosing the winding 43 and extending between the pole faces 38, 39 into and out of the armature turn 32 and around the end of the ring 19. The flux circuit includes the annular air gaps around the inner and outer flanges of the core 44 but the energy required for activating the pilot clutch is so small that this gap may be relatively wide, thus avoiding the necessity for close coupling of the stationary and rotary parts of the flux circuit.

While the peripheral surface 29, 31 of the band engaged by the actuator coil 30 may be cylindrical as in the form shown in FIG. 9, it is preferable to taper this surface axially so that during winding up of the coil by the pilot clutch torque, the turns of the coil beginning with the free end turn 32 will be brought into engagement with the band in succession. This is accomplished in the present instance by making the end portion 31 of the band surface at the free end of the coil cylindrical while reducing the diameter of the other end portion 29 progressively beginning at the inner end of the cylindrical part 31. Herein, the taper is at an angle about ten degrees and starts at about the second turn of the actuator so that at least the free end turn 32 will always engage the cylindrical surface 31 when the coil is contracted. The diameter of the surface 31 when the band is new and expanded is substantially equal to the internal diameter of the actuator coil when the latter is relaxed.

In one of its aspects, the present invention includes a novel mounting for the anchored end of the actuator coil to enable this end to withstand the severe stressing encountered in heavy duty service use. For this purpose, the coil wire is bent laterally in opposite directions as indicated at 48 and 49 (FIGS. 4 and 6) at the junction of the last turn 33 of the coil and the adjacent turn 52. The intervening length 50 of wire extends diagonally of the clutch axis over an arc of substantial length and is disposed within a window 54 in the outer edge portion of the driven disk. Beyond the window, the end turn is disposed in and extends around a groove 55 in the outer face of the driven disk 11. The turn is held loosely in the groove by the edge portion of washers 56 (FIGS. 6 and 7) clamped by screws 57 against the bottoms of recesses 56ª in the outer face of the disk.

The extreme end of the wire is bent laterally at right angles and the hook 58 thus formed is extended into a slot 59 in the disk 11 so as to engage the end of this slot which provides the anchor 34 for holding the coil end against turning relative to the driven disk during winding up of the coil to actuate the shoe. Under the tension thus developed in the wire, the full length of the end turn 33 is drawn inwardly and tightened around the inner wall of the groove 55 and acts like a capstan in developing a friction force of substantial magnitude to reduce the tension on the hook 58.

When free or relaxed, the actuator coil 30 is cylindrical and of a diameter substantially equal to the cylindrical part 31 of the band periphery. Thus, in order to bring the last effective turn 52 of the coil into gripping engagement with smallest diameter of the band surface 29, the diagonal part 50 of the wire in the window 54 must be shifted inwardly which is accompanied by a corresponding edgewise radial bending of the wire of the outer or end turn 33 between the anchor 34 and the window. To accommodate this while distributing the edgewise bending over an arc of substantial length and also preserving the capstan action above described, the inner wall of the groove 55 comprises an arcuate surface 61 extending from the anchor 34 clockwise (FIG. 7) around the disk 11 for about a half revolution and at a radius substantially equal to the interior of the actuator coil when free. The radius of the remaining portion 62 of the groove wall decreases progressively around the disk to a point beyond the window 54 and merges with the arc 61 at a ledge 63. As a result, the edgewise bending of the wire is distributed over a substantial arc, nearly a half circle in this instance.

To minimize the stressing of the wire forming the last turn 33 of the coil, the bottom surface 65 of the groove 55 is sloped axially at a small angle starting at the end 66 (FIG. 6) of the window 54 and rising gradually through a substantial arc on the disk 11, a half circle in this instance. Since the groove 55 is deepest adjacent the window, the offset 50 in the wire may be of minimum width and the lateral bending of this portion of the wire during engagement of the clutch is reduced correspondingly.

Such a rise in the bottom surface 65 is of further use in facilitating the assembly of the actuator coil and the driven disk 11. To effect such assembly, the hooked end 58 of the coil is inserted through the window 54 past the end 66 thereof as shown in FIG. 8, the end of the hook coming against the inclined surface 65. Then, as the disk is turned to advance more of the end turn 33 through the window, the hook rides up the incline and snaps inwardly when it comes into register with the slot 59. The assembly is then complete.

In its primary aspect, the present invention contemplates deriving as an incident to engagement of the band and the surfaces 27, 28, an auxiliary friction torque which turns the band and applies such torque to the actuator coil in a direction to supplement and greatly amplify the torque of the magnetic pilot clutch 42 and effect a further and progressively increasing wind-up of the coil until the load on the driven shaft has been overcome. Preferably though not necessarily, the auxiliary pilot torque is produced in the present instance by disposing the groove walls 27, 28 at different angles relative to the clutch axis so that, as a result of wedging the band into the groove, a pressure and therefore a friction force is developed at one wall which is sufficient to overcome the opposing friction forces at the other wall and cause the band to be turned relative to the anchored end of the coil in the same direction as the armature of the pilot clutch. In such turning, the band exerts on the coil turns engaged thereby a friction torque acting in the same direction as the pilot clutch torque thus supplementing the latter and correspondingly increasing the torque acting in the same direction as the pilot clutch torque thus supplementing the latter and correspondingly increasing the torque winding up the coil and the actuator force pressing the band against the surfaces 27 and 28 of the main friction clutch.

In the present instance, the desired amplification of the pilot torque is achieved by disposing the driving surface 27 at a substantially lesser angle relative to the clutch axis than the driven surface 28. To simplify manufacture and make the torque differential as large as possible for any given angle of the wall 27, the wall 28 is preferably flat and disposed in an axial plane so as to minimize the pressure developed at the latter wall during wedging of the band into the groove. The latter is V-shaped in cross-section by virtue of the convergence of the walls 27, 28 inwardly and toward each other. Of course, the desired difference in friction torque at the respective surfaces may be achieved when the surfaces 27, 28 are curved or composed of a plurality of flat areas complementing the inwardly converging contours of the sides of the band 25.

In order to insure proper release of the clutch under all conditions when the magnet winding 43 is deenergized, the tangent of the angle included between the walls 27 and 28 should be greater than the coefficient of friction of the materials involved. When the band is composed of ordinary brake lining material, it is desirable to cone the surface 27 at an angle of more than thirty degrees and within a range of about thirty to fifty degrees, an angle of about forty-five degrees usually being preferred. The tangent 1.0 of this angle permits the use of most well-known friction materials.

Movement of the free floating band 25 to derive the desired supplemental torque for amplifying the actuating pressure on the band is not dependent on the contour of the outer surface of the band so long as the surfaces 27, 28 are properly related. Such a modification is shown in FIG. 9 in which the parts corresponding to those previously described bear the same reference numerals even though varying somewhat in shape. In this modification, the only important difference is the extension of the cylindrical contour 29 of the outer periphery of the band over the full width of the band. That is to say, in response to winding up and collapse of the actuator coil 30, all of the turns engage the band at the same time instead of successively as above described. Nevertheless, the band turns angularly in response to the initial engagement by the actuator coil by the action of the pilot clutch and develops the desired supplemental torque for continuing the windup of the coil and corresponding amplification of the torque output of the main clutch.

*Operation*

When the magnet winding 43 of the clutch above described is deenergized with the driving pulley rotating, the driven disk 11 will be at rest with the parts positioned as shown in FIG. 1. The actuator coil 30 is relaxed and thus expanded to its free end diameter with the free end turn 32 out of rubbing contact with the rotating pole faces 38, 39 of the magnet. Now, when the winding is energized, flux threads the circuit 41 to attract the armature 32 to the pole faces thereby applying a friction torque to this end in a direction to utilize the turning of the driving disk to wind up the actuator coil 30 whose end 58 is anchored on the then stationary driven disk 11. By such winding, the coil is contracted around the outer periphery of the band, the turn 32 being the first to come against the band surface 31 to apply inward radial pressure around the entire periphery thereof thereby contracting the band and wedging the same into the V-groove and against the surfaces 27 and 28. Because of the lesser inclination of the coned wall 27, the pressure between the latter and the band is increased by such wedging action, the resulting increase in friction between these parts being sufficient to overcome the friction between the band and the other wall 28, as a result of which the band turns with the driving pulley and applies a friction torque to the inner surface of the engaged turn 32. This torque is in the same direction as and therefore supplements the torque of the magnetic pilot clutch so as to augment the latter and thereby effect a further winding up of the coil and contraction of the remaining turns thereof.

The second or adjacent turn 70 is thus drawn into contact with the tapered band surface 29 so as to become effective not only in pressing the band tighter into the V-groove 27, 28 to increase the main clutch torque but also coacts with the band to form a second auxiliary pilot clutch. The latter transmits the motion of the band to the turn 70 in a direction to continue winding of the coil and thereby contract the next turn 71 against the band. The third auxiliary pilot clutch thus becomes effective to further build up the main clutch torque and also the pilot torque winding up the actuator coil. This action continues until the prevailing load has been overcome or the full length of the actuator coil has been contracted into gripping engagement with the band. Then, if the main clutch torque is not sufficient to overcome the prevailing load on the driven member 11, the band will continue to turn with the driving member 10 and continue the winding of the coil under the action of the magnetic clutch and the auxiliary clutches formed by the outer surface of the band coacting with the opposed surfaces of the turns 32, 70 and 71. Such further wind-up of the coil and the accompanying increase in the contracting pressure on the band continues until the torque developed by the main clutch overcomes the prevailing load.

It will be apparent that after the magnetic pilot clutch 42 has been activated to initiate winding up of the actuator coil and engage the main clutch, the auxiliary pilot clutches formed by the opposed surfaces of the band and the coil turns become effective as these turns come into contact with the band. Thus, the main and pilot clutch torques build up progressively until the load is overcome and the driving and driven members are coupled together without further slipping. Usually, this involves contraction of substantially all turns of the actuator coil into engagement with the tapered surface 29 of the band as shown in FIG. 2. As a result of the auxiliary pilot clutch action above described, the clutch adjusts itself automatically to the prevailing load on the driven member.

FIG. 9 shows a modification of the clutch above described in which the cylindrical external surface 31 of the band 25 is extended across the full width of the band. This clutch operates in the same manner as above described to produce a turning of the band 25 relative to the driven disk 11 and the exertion of an auxiliary friction torque supplementing that of the magnetic clutch 42 and acting to wind up the actuator coil 30. In this instance, the auxiliary torque is exerted initially on all of the turns of the actuator coil since the latter come into engagement with the band substantially simultaneously instead of successively.

It will be apparent from the foregoing that by a simple correlation between the band 25 and the driving and driven walls 27, 28 forming the main friction clutch, the elements of the latter are themselves utilized to perform the additional function of a supplemental pilot clutch for actuating the actuator coil 30. As a consequence, the structure of the coil clutch is maintained exceedingly simple and the size and manufacturing cost for a given torque capacity are reduced greatly as compared to prior friction clutches. In addition, the clutch is always releasable reliably over its full operating range. Moreover, in view of the substantial amplification of the pilot clutch torque achieved through the supplemental action above described, the pilot clutch may be of small capacity and even low magnetic efficiency in the interest of simplifying its construction or the mounting of its parts.

While in the illustrative embodiment shown in the drawings and described above, the invention in its several aspects is incorporated in a clutch of the contracting band type, it is equally applicable to expanding clutches in which gripping engagement of the band and the driving and driven surfaces is achieved by unwinding the actuator coil 30 in response to activation of the pilot clutch, the wire of the coil being placed under compression instead of tension. Also, it will be apparent from the foregoing that the actuator coil may be anchored on the driving disk as well as on the driven disk as in the clutch above described, the pole pieces of the magnet then being carried by the driven disk. When the coupling above described is used as a friction brake, one or the other of the disks 10 and 11 is mounted stationarily.

This application is a continuation-in-part of my application Ser. No. 84,584, filed January 24, 1961, new abandoned.

I claim as my invention:

1. A friction coupling comprising two members relatively rotatable about a common axis and having opposed annular walls converging radially toward each other and coacting to form a groove, a free floating arcuate band of a cross-section complementing the cross-section of and loosely seated in said groove, said band having an exposed peripheral surface, an actuator for pressing said band radially into said groove comprising a helical coil of resilient wire telescoped with said surface, means anchoring one end of said coil to one of said members, and means on the other member controlling the winding and unwinding of said coil to change the coil diameter in opposite directions whereby to apply radial pressure to said band and force the same into said groove against both of said walls to engage the coupling or release such pressure and disengage the coupling, one of said groove walls being disposed relative to said axis at a substantially greater angle than the other groove wall whereby to develop friction torques of different magnitudes between the opposite sides of said band and the respective walls on said members, and the resultant of said friction torques acts in the same direction as said winding means whereby said band, acting under such torque differential, cooperates with said coil to form an auxiliary friction clutch augmenting the action of said winding means in changing the diameter of said coil.

2. A friction coupling as defined in claim 1 in which the groove wall on said first member is disposed substantially in an axial plane.

3. A friction coupling as defined in claim 1 in which said exposed band surface engaged by said actuator coil is cylindrical.

4. A friction coupling as defined in claim 1 in which the tangent of the angle included between said groove walls is geater than the coefficient of friction between said walls and the sides of said band.

5. A friction coupling as defined in claim 1 in which the groove wall on one of said members is disposed substantially perpendicular to said coupling axis and the other wall is coned at an angle of between thirty and fifty degrees.

6. A friction coupling as defined in claim 5 in which said cone angle is approximately forty-five degrees.

7. A friction coupling having, in combination, two members mounted for relative rotation about a common axis and presenting two annular friction surfaces, a radially expansible and contractible band engageable with both of said surfaces to couple said members together, a helically wound coil of spring wire telescoped with the periphery of said band opposite said friction surface, means anchoring one end of said coil to one of said members, the other end turn of the coil being normally free, means on the other of said members providing a surface adapted for axial gripping engagement with said free end turn and forming therewith a pilot friction clutch adapted when energized during relative turning of said members to apply a friction torque to said end turn and change the diameter of said coil in a direction to force said band radially against said friction surfaces, said pilot clutch surface being axially spaced inwardly from the adjacent side edge of said band whereby to prevent engagement of said end turn with said band edge.

8. A friction coupling comprising two members relatively rotatable about a common axis and having axially spaced annular surfaces, a radially expansible and contractible arcuate band extending loosely around said surface for free angular floating relative thereto and for gripping engagement therewith to couple the members together frictionally, said band having an exposed radially facing peripheral surface, an actuator for pressing said band against said friction surfaces comprising a helical coil of resilient wire telescoped with said peripheral surface, means anchoring one end of said coil to one of said members and holding the same against angular displacement relative thereto, the other end of said coil being free, and a pilot friction clutch engageable selectively to couple said free coil end to the other of said members whereby to apply a torque thereto in a direction to change the diameter of the coil and apply radial pressure to said band for engaging the coupling, said friction surfaces being disposed at different angles to create friction torques of different magnitudes at the respective surfaces with the resultant of such torques acting in a direction and being of sufficient magnitude to further turn said band and continue to change the diameter of said coil and the radial pressure exerted thereby on said band.

9. A friction coupling comprising two members relatively rotatable about a common axis and having axially spaced annular surfaces cooperating to form an outwardly opening V-groove, an arcuate band extending loosely around said groove for free angular floating and contractible into gripping engagement with said surfaces to couple the members together frictionally, a helical coil of resilient wire telescoped around said band, means anchoring one end of said coil to one of said members and holding the same against angular displacement relative thereto, the other end of said coil being free, and a pilot friction clutch engageable selectively to couple said free coil end to the other of said members whereby to apply a torque thereto in a direction to wind up said coil and press said band into said groove and against both of said friction surfaces, the latter surfaces being disposed at different angles to provide different pressures and create friction torques of different magnitudes at the respective surface with the resultant of such torques supplementing said pilot clutch torque and being of sufficient magnitude to turn said band in a direction to further change the diameter of said coil and the radial pressure exerted thereby on said band.

10. A friction coupling comprising first and second members providing relatively rotatable axially spaced friction surfaces, a band telescoping around said surfaces and radially contractible and expansible into and out of gripping engagement with said surfaces to couple and uncouple said members, said first member having an arcuate outer peripheral surface of approximately the diameter of the band disposed adjacent one side of the band but spaced outwardly and axially therefrom, a helically wound coil of wire telescoped around said band and having a first end turn disposed beyond one edge of said band and wrapped around said peripheral surface, an anchor on said first member holding the end of said first turn against angular displacement, the opposite end turn of the coil being free, and means for applying a friction pilot torque to said free end turn to wind up said coil and contract the band against said friction surfaces while tensioning said first turn around said peripheral surface to derive a friction force exerted on such turn to relieve the stressing of the anchored end of the coil, said coil being bent in opposite directions along the coupling axis and at angularly spaced points near the inner end of said first turn whereby to extend the intervening length of the coil wire diagonally and thereby space such turn endwise from the rest of the coil.

11. A friction coupling comprising first and second members providing relatively rotatable axially spaced friction surfaces, a band telescoping around said surfaces and radially contractible and expansible into and out of gripping engagement with said surfaces to couple and uncouple said members, the outer periphery of said band tapering axially toward a first one of said members and said first member having an arcuate outer peripheral surface of substantial arcuate length lying along one side of said band and sloping radially and circumferentially substantially from the smallest to the substantially largest radii of said tapered periphery of the band, a helically wound coil of wire telescoped around said band and having a first end turn wrapped around said sloping peripheral surface, an anchor on said first member holding the end of said first turn against angular displacement adjacent said largest radii, and means for applying a friction pilot torque to the other end of said coil to wind up the coil to press the band against said friction surfaces while tensioning said first coil turn around said peripheral surface as said coil is wound up and becomes contracted around the smaller end of said tapered peripheral band surface whereby said sloping surface exerts a friction force opposing the wind-up torque of said coil to thereby correspondingly reduce the torque required to be sustained by said anchor.

References Cited in the file of this patent

UNITED STATES PATENTS

| | | |
|---|---|---|
| 786,306 | Neckerman | Apr. 4, 1905 |
| 1,182,589 | Schnuck | May 9, 1916 |
| 2,127,768 | Debrie | Aug. 23, 1938 |
| 2,484,185 | Pepper | Oct. 11, 1949 |
| 2,518,701 | Luenberger | Aug. 15, 1950 |
| 2,566,539 | Starkey | Sept. 4, 1951 |
| 2,798,581 | Supitilov | July 9, 1957 |

FOREIGN PATENTS

| | | |
|---|---|---|
| 44,261 | Sweden | July 10, 1918 |
| 85,862 | Austria | Oct. 10, 1921 |

UNITED STATES PATENT OFFICE
CERTIFICATE OF CORRECTION

Patent No. 3,149,705                              September 22, 1964

Robert H. Shoquist

It is hereby certified that error appears in the above numbered patent requiring correction and that the said Letters Patent should read as corrected below.

In the grant, line 3, and in the heading to the printed specification, line 4, for "Beloit", each occurrence, read -- South Beloit --.

Signed and sealed this 9th day of March 1965.

(SEAL)
Attest:

ERNEST W. SWIDER
Attesting Officer

EDWARD J. BRENNER
Commissioner of Patents